Dec. 18, 1962  G. F. SADDOCK  3,068,702
GAUGE
Filed Oct. 14, 1959
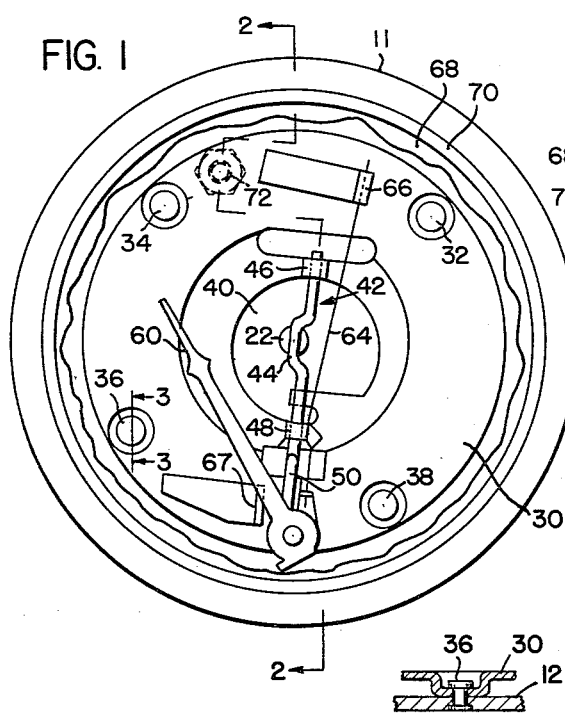
FIG. 1
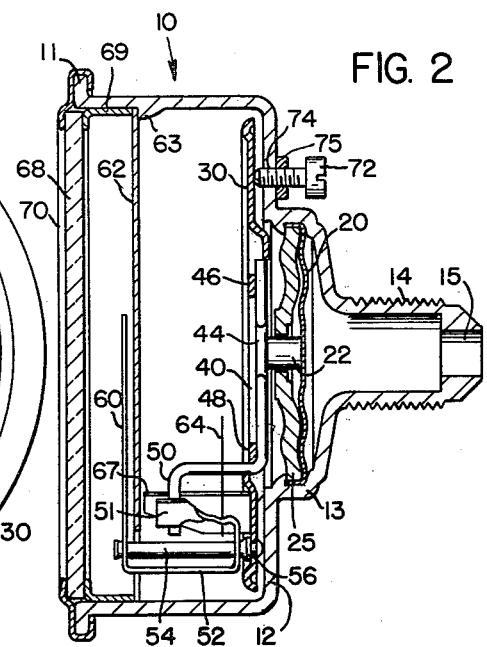
FIG. 2
FIG. 3
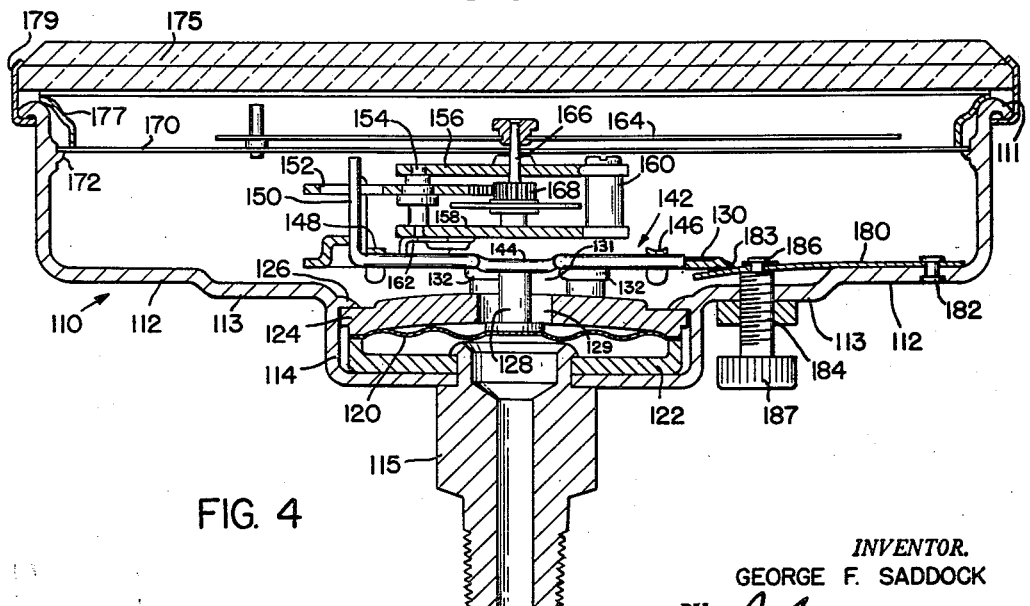
FIG. 4
INVENTOR.
GEORGE F. SADDOCK
BY
Attorney United States Patent Office 3,068,702
Patented Dec. 18, 1962

3,068,702
GAUGE
George F. Saddock, Brighton, N.Y., assignor, by mesne assignments, to American Radiator & Standard Sanitary Corporation, New York, N.Y., a corporation of Delaware
Filed Oct. 14, 1959, Ser. No. 846,446
4 Claims. (Cl. 73—408)

The present invention relates to gauges, and more particularly to pressure gauges. In its more specific aspect, the invention relates to diaphragm-operated pressure gauges.

Heretofore, it has been necessary to calibrate conventional diaphragm-operated pressure gauges before final assembly by bending the pointer arm or otherwise deforming certain moving parts of the gauge so that the pointer will align with the zero graduation on the dial when the gauge is not under pressure. The assembly of the gauge was then completed thus preventing any further recalibration or resetting of the gauge.

The primary object of the present invention is to provide an improved pressure gauge, the construction of which permits accurate calibration of the gauge after final assembly.

Another object of this invention is to provide an improved pressure gauge which may be calibrated and recalibrated after final assembly but which is simple in its construction, relatively inexpensive to manufacture, and reliable in operation.

Other objects of this invention will become apparent from the specification, the drawing, and the appended claims.

In the drawing:

FIGURE 1 is a front elevation of a pressure gauge built according to one embodiment of this invention with the dial removed showing the interior mechanism of the gauge;

FIG. 2 is a sectional view of this gauge taken at line 2—2 of FIG. 1 and looking in the direction of the arrows;

FIG. 3 is a detail sectional view taken on line 3—3 of FIG. 1 and looking in the direction of the arrows; and FIG. 4 is an axial section through a pressure gauge built according to another embodiment of this invention.

In both embodiments of the invention illustrated, diaphragm-operated pressure gauges are shown wherein the motion of a diaphragm is imparted to a crank arm that transmits movement to a pointer mechanism. The crank arm is pivotally mounted on a flexible plate which is attached to the gauge housing. A pin, which is attached to the diaphragm, extends through a central opening in this flexible plate and engages an offset portion of the crank arm. An extension of the crank arm engages a pointer mechanism which is also mounted on this flexible plate. The flexible plate is adjustable by means exterior of the gauge casing to flex or deform the plate, thereby changing the position of the crank arm, so that the pointer of the gauge can be set to the zero graduation on the gauge dial, when the diaphragm is subject to zero pressure.

Referring first to the embodiment shown in FIGS. 1 and 2 by numerals of reference, 10 denotes the gauge case or housing. This case is provided with a sealing flange 11, a base portion 12, a diaphragm housing chamber 13, and an externally threaded generally cylindrical stem portion 14. The threaded stem portion 14 has an opening 15 in its lower end through which the fluid, whose pressure is to be measured, is admitted to the diaphragm chamber.

The flexible diaphragm 20 seats on an annular radially disposed seat in the diaphragm chamber 13. This diaphragm may be made in conventional fashion of relatively thin concentrically corrugated metal. An operating stud 22 is secured to the diaphragm at its center and projects forwardly from the upper or front face of the diaphragm 20. The diaphragm is backed up, as is customary, by a relatively unyielding back plate 25 which is also corrugated concentrically to support the diaphragm 20 when subjected to extreme pressures.

A plate 30, which is made of thin flexible spring material is secured to the base portion 12 of the casing 10 by a plurality of rivets 32, 34, 36 and 38. These rivets are located adjacent the periphery of the flexible plate 30 and are spaced substantially ninety degrees from each other. The central portion of the flexible plate 30 has an opening 40 with which the stud 22 is aligned. A crank 42 having an offset portion 44 is pivotally mounted across the opening 40 in aligned bearings 46 and 48 which are struck up in the plate 30. The offset portion 44 of the crank 42 is positioned over and engageable by the stud 22.

An extension 50 of the crank arm 42 engages one leg 51 of a U-shaped member 52. This U-shaped member 52 is mounted to pivot upon a pin 54 which is secured to the plate 30 at 56. The U-shaped member 52 has an indicating needle or pointer 60 formed integral therewith which is adapted to read against graduations provided on a dial 62. The dial 62 is supported in the case 10 by tangs 63 peened inwardly of the case. A spring wire 64, which is mounted at one end within an opening in the leg 51 of the U-shaped member 52 and which is secured at its opposite end to a lug 66, that is struck up from the flexible plate 30, holds the leg 51 in engagement with the extension 50 of the crank arm. A stop member 67 is struck up from the plate 30 to limit the movement of the U-shaped member 52 in one direction. A glass 68, that is seated against a spacing ring 69, and a bezel 70, which holds the glass in place, close the upper end of the case 10.

A screw 72 is threaded into the base portion 12 of the casing at 74. The inside end of the screw 72 engages the flexible plate between the rivets 32 and 34. A lock nut 75 is threaded on the screw 72 exteriorly of the casing.

If desired the plate 30 may have a threaded opening therethrough or a threaded bushing staked or attached to the plate. The screw 72 would then pass through a clearance hole in the housing and adjustably thread in the opening or bushing, to flex the plate 30.

Prior to assembly, the gauge may be calibrated initially so that the pointer 60 shows a slight reading above the zero graduation on the dial when the gauge is disconnected from the source of pressure. After the final assembly, the screw 72 may then be adjusted to engage that portion of the flexible plate 30 between the rivets 34 and 32. The pressure of the screw 72 deforms the flexible plate 30 slightly which changes the position of the crank arm 42 which causes the extension 50 to urge the pointer 60 into registry with the zero graduation on the dial. The lock nut 75 is then threaded against the casing to hold the screw 72 in its adjusted position. After usage, the adjustment screw 72 may be used to recalibrate or reset the gauge so that the pointer aligns with the zero position by merely increasing or decreasing pressure of the screw against the plate 30.

Another embodiment of this invention is shown in FIG. 3 of the drawing. In this embodiment the leverage between the diaphragm and the pointer is increased so that a greater movement is imparted to the pointer for a given motion of the diaphragm. Referring to FIG. 3 by numerals of reference, 110 denotes the gauge case or housing. This case is provided with a sealing flange 111, a base portion 112 having an annular recess 113, a diaphragm housing chamber 114, and an externally threaded stem portion 115 which is riveted centrally in the chamber 114. The flexible diaphragm 120 seats at its periphery on an annular seating member 122. Disposed above the diaphragm 120 is a rigid backing plate 124 which is sealed in the diaphragm chamber 114 by inwardly peening the case as indicated at 126. The backing plate prevents the diaphragm 120 from being ruptured under excessive pressure. As in the previous embodiment the diaphragm may be made in conventional fashion of relatively thin concentrically corrugated metal. An operating stud 128 is secured to the diaphragm at its center and projects forwardly from the upper or front face of the diaphragm through an opening 129 in the backing plate 124.

A flexible plate 130 having a central opening 131 is mounted in the case 110 by a plurality of rivets 132 which are spaced from each other substantially ninety degrees similar to the rivets shown in the previous embodiment. A crank arm 142 is pivotally attached to the plate 130 in bearings 146 and 148. The crank arm 142 has an offset portion 144 which is positioned over the opening 131 in engagement with the operating stud 128. The crank arm 142 has a right angular extension 150 which engages a gear segment 152 that is mounted to pivot about a pin 154. The pin 154 is attached at each of its ends to plates 156 and 158, respectively, which are spaced from each other by a bushing or sleeve 160. The plate 158 is secured to the flexible plate 130 by an arm 162 which is integral with plate 130. An indicating pointer 164 is mounted to pivot intermediate its ends by a pin 166 to which is rigidly attached a pinion 168. The gear 168 is in mesh with the segmental gear 152. Thus, as the stud 128, which is attached to the diaphragm, moves, the motion thereof is transmitted through the segment 152 to the pinion 168 to rotate the pointer 164.

The pointer 164 is adapted to read against graduations provided on a dial 170. The dial 170 may be mounted conventionally in the case 110 by tangs 172 which may be peened inwardly of the case. A glass 175 is seated against a spacing ring 177 and is secured by an annular bezel 179 which engages the flange 111 to close the upper end of the case.

A leaf spring 180 is fastened at one of its ends to the base portion 112 of the case 110 by one or more rivets 182. The spring extends inwardly in the casing and engages beneath the edge of the flexible plate 130. In positioning the leaf spring 180 in the casing it has been found preferable to have the spring 180 extend outwardly from the flexible plate 130 in line with arm 142. If desired, the free end of the spring 180 may be attached adjacent the edge of the plate 130 at 183 by soldering, brazing, or in any other well known manner. A screw 184, which is adjustably threaded into the portion 113 of the casing is securely attached to the spring 180 by a stud and lock washer 186. The screw is attached intermediate the ends of the spring 180 and is adjacent to but spaced from the edge of the plate 130. A knurled knob 187, integral with the screw, is provided to manually rotate the screw.

After final assembly of this embodiment of the invention, the screw 184 may be threaded in either direction to raise or lower the plate 130 thus changing the position of the crank arm 142. The screw 184 deflects the spring 180 which causes the spring to apply more or less force to the edge of the plate 130 to change its position. This causes the extension 150 of the arm 142 to move the pointer 164 relative to the zero graduation on the dial 170 when the diaphragm is not subject to pressure, thus permitting pointer position adjustment. This embodiment of the invention provides a slightly greater leverage to the flexible plate 130 and thus is suitable for gauges of larger size.

It is apparent that other means of flexing, or raising and lowering the plates 30 and 130 such as by rotating or sliding cam, which may be moved by a shaft or a screw, may be employed.

It is apparent that the position of the adjustment means, which are shown herein in the form of a leaf spring controlled by a screw and also a screw in direct contact with the plate, may be modified relative to the edge of the plate or relative to the crank arm to provide for the proper adjustment according to the needs of practice.

While the invention has been shown herein in connection with a pressure gauge, it is understood that it can be used in other types of gauges or instruments, such as temperature gauges, liquid level indicators, and the like.

While the invention has been described in connection with two specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A gauge, comprising a casing, condition-responsive means movably mounted in said casing, a flexible plate, means for attaching the flexible plate at spaced intervals adjacent the marginal edge of the plate to said casing, a crank pivotally mounted on said plate, means extending through said plate connecting said crank to said condition-responsive means to move said crank upon movement of said condition-responsive means, the pivotal axis of said crank being positioned between adjacent attaching means, a stationary reference means in said casing, a movable indicating member operatively connected to said crank to assume various positions relative to the stationary reference means depending upon the pivotal position of said crank, and adjustable means mounted in said casing and engaging said flexible plate adjacent the edge of said flexible plate between adjacent attaching means to flex said plate relative to the casing to change the position of said indicating member relative to said reference means independently of the movement of said crank under actuation of said condition-responsive means.

2. A gauge, comprising a casing, condition-responsive means movably mounted in said casing, a flexible plate, means for attaching the flexible plate at spaced intervals adjacent the marginal edge of the plate to said casing, a crank pivotally mounted on said plate, means extending through said plate connecting said crank to said condition-responsive means to pivot said crank in response to movement of said condition-responsive means, the pivotal axis of said crank being positioned to be between adjacent attaching means, a stationary reference means in said casing, a movable indicating member operatively connected to said crank to assume various positions relative to the stationary reference means depending upon the pivotal position of said crank, a leaf spring attached at one end to said casing at a point spaced from the edge of said plate, the free end of said leaf spring engaging said plate adjacent the edge of the plate intermediate two adjacent plate attaching means, and adjustable means mounted in said casing and engaging said leaf spring intermediate the ends of said spring, said adjustable means being adjustable manually to flex said plate relative to the casing to change the position of said indicating member relative to said reference means independently of the movement of said crank under actuation of said condition-responsive means.

3. A pressure gauge, comprising a casing having a diaphragm movably mounted therein, a flexible plate mounted in spaced relation to said diaphragm and generally parallel thereto, means securing said flexible plate in said casing at spaced intervals adjacent the peripheral edge of said plate, said plate having a central opening, a crank arm pivotally attached to said plate adjacent opposite sides of the opening, said crank arm having an offset portion intermediate its ends positioned across said opening, means connected to said diaphragm and engaging said offset portion to impart pivotal movement to said crank arm in response to the movement of the diaphragm, a graduated dial mounted in said casing, a pointer movably mounted in said casing, said pointer being operatively connected to said crank arm to read against various graduations on said dial in accordance with the pivotal position of said crank arm, and adjustable means mounted in said casing and engaging said flexible plate between adjacent securing means, and substantially axially aligned with the pivotal axis of said crank arm, said adjustable means being manipulable exteriorly of the casing to flex said plate relative to the casing to change the position of said pointer relative to the graduations on said dial independent of the movement of said diaphragm.

4. A pressure gauge, comprising a casing having a diaphragm movably mounted therein, a flexible plate mounted in spaced relation to said diaphragm and generally parallel therewith, means securing said flexible plate to said casing at spaced intervals adjacent the peripheral edge of said plate, said plate having a central opening, a crank arm pivotally attached to said plate adjacent opposite sides of said opening, said crank arm having an offset portion intermediate its ends positioned across said opening, means connected to said diaphragm and engaging said offset portion to impart pivotal movement to said crank arm in response to the movement of the diaphragm, a graduated dial mounted in said casing, a pointer movably mounted in said casing, said pointer being operably connected to said crank arm to read against various graduations on said dial in accordance with the pivotal position of said crank arm, a leaf spring attached at one end to said housing, the other end of said spring engaging said plate adjacent its peripheral edge between adjacent plate securing means and substantially aligned with the pivotal axis of said crank arm, and adjustable means mounted in said casing and engaging said leaf spring intermediate its ends, said adjustable means being manipulable exteriorly of the casing to cause said spring to flex said plate relative to the casing to change the position of said pointer relative to the graduations on said dial independent of the movement of said diaphragm.

References Cited in the file of this patent

UNITED STATES PATENTS

| | | |
|---|---|---|
| 1,763,354 | Ileman | June 10, 1930 |
| 1,805,176 | Hastings | May 12, 1931 |
| 2,123,532 | Hastings et al. | July 12, 1938 |

FOREIGN PATENTS

| | | |
|---|---|---|
| 499,569 | Great Britain | Jan. 25, 1939 |